United States Patent
Reinhart

(10) Patent No.: US 7,560,156 B2
(45) Date of Patent: Jul. 14, 2009

(54) STRIP SHAPED SAFEGUARDING ELEMENT

(75) Inventor: Werner Reinhart, Nürnberg (DE)

(73) Assignee: Leonhard Kurz GmbH & Co. KG, Furth (DE)

( * ) Notice: Subject to any disclaimer, the term of this patent is extended or adjusted under 35 U.S.C. 154(b) by 478 days.

(21) Appl. No.: 10/514,743

(22) PCT Filed: Apr. 25, 2003

(86) PCT No.: PCT/DE03/01344

§ 371 (c)(1),
(2), (4) Date: Nov. 17, 2004

(87) PCT Pub. No.: WO03/097378

PCT Pub. Date: Nov. 27, 2003

(65) Prior Publication Data

US 2006/0055169 A1    Mar. 16, 2006

(30) Foreign Application Priority Data

May 22, 2002  (DE)  ................. 102 22 433

(51) Int. Cl.
B41M 5/00 (2006.01)
B44C 1/17 (2006.01)
G03G 7/00 (2006.01)

(52) U.S. Cl. ............ 428/195.1; 428/916; 283/72; 283/107; 283/109; 359/2; 359/580; 359/585; 359/587; 359/589

(58) Field of Classification Search .......... 428/195.1, 428/916; 283/72, 107, 109; 259/2, 580, 259/585, 587, 589

See application file for complete search history.

(56) References Cited

U.S. PATENT DOCUMENTS

| 4,930,866 A | 6/1990 | Berning et al. |
| 5,820,971 A * | 10/1998 | Kaule et al. ............. 428/209 |
| 6,428,051 B1 | 8/2002 | Herrmann et al. |
| 7,054,042 B2 * | 5/2006 | Holmes et al. ............. 359/2 |

FOREIGN PATENT DOCUMENTS

| DE | 2 212 350 | 10/1973 |
| DE | 35 11 146 A1 | 10/1986 |
| DE | 36 09 090 A1 | 9/1987 |
| DE | 43 14 380 A1 | 11/1994 |
| DE | 43 34 847 A1 | 4/1995 |
| DE | 44 31 531 A1 | 3/1996 |

(Continued)

OTHER PUBLICATIONS

Certified Translation of DE 100 13 410 A (OVD Kinegram AG; Griebel et al.), Sep. 20, 2001 (foreign patent translated by Office of Translation Services, United States Patent & Trademark Office, Jul. 2007).*

Primary Examiner—Bruce H Hess
Assistant Examiner—David J Joy
(74) Attorney, Agent, or Firm—Hoffmann & Baron, LLP

(57) ABSTRACT

The present invention relates to a security element in the form of a strip. The strip exhibits optical effects which vary, depending on the illumination or viewing direction. The optical effects are provided only in one or more definably delimited, mutually spaced surface regions. The strip outside the visually variable surface regions is transparent or is adapted to the appearance of the surface of the substrate.

21 Claims, 1 Drawing Sheet

FOREIGN PATENT DOCUMENTS

| | | |
|---|---|---|
| DE | 298 05 481 | 9/1998 |
| DE | 198 13 314 A1 | 9/1999 |
| DE | 100 13 410 A1 | 9/2001 |
| EP | 0 105 099 B1 | 4/1984 |
| EP | 0 375 833 B1 | 7/1990 |
| EP | 0 435 029 B2 | 7/1991 |
| RU | 2111864 C1 | 5/1998 |
| WO | WO 92/09444 | 6/1992 |
| WO | WO9510420 | 4/1995 |
| WO | WO 01/03845 A1 | 1/2001 |
| WO | WO 01/03945 A1 | 1/2001 |
| WO | WO0168383 A1 | 9/2001 |
| WO | WO 02/00445 A1 | 1/2002 |

* cited by examiner

STRIP SHAPED SAFEGUARDING ELEMENT

CROSS-REFERENCE TO RELATED APPLICATIONS

This application is a National Phase application of International Application No. PCT/DE03/01344 filed Apr. 25, 2003, which claims priority based on German patent application No. 10222433.1 filed on May 22, 2002, which are incorporated herein by reference.

BACKGROUND OF THE INVENTION

The invention concerns security elements in the form of a strip which are in the form of a transfer film, in particular a hot stamping film and which can be applied to the surface of a substrate, in particular a value-bearing document such as a banknote, a cheque, a share certificate, a credit card and so forth or an identity card or pass, for safeguarding authenticity or quality of the substrate, comprising at least two plastic or lacquer layers between which is arranged at least one optically effective layer and/or structure producing an optical effect which is variable in dependence on the illumination or viewing angle.

Security elements of that kind are increasingly used in particular on banknotes but also on other documents which are to be suitably safeguarded in terms of quality or originality, but additionally also on articles. For example the low-value Euro banknotes (5, 10 and 20 Euro notes) carry corresponding, strip-shaped security elements in which an optically effective structure provides that the appearance of the corresponding strip-shaped security element changes in dependence on the illumination or viewing angle, for example it changes between the "C" symbol and other features. The strip-shaped security elements which are applied to the Euro banknotes are hot stamping films which include at least one generally thermally deformable protective lacquer layer into which the structure is embossed by means of a suitable master. The protective lacquer layer is usually transparent. If the optical effect of the structure is to be viewed in incident light, the structure is generally covered in the course of the stamping film manufacturing procedure by means of a layer which increases light reflection, for example a reflecting metal layer or a layer with a refractive index which is suitably different in relation to that of the protective lacquer layer. Then, there is applied to that combination of protective lacquer layer and reflection-enhancing layer at least one further lacquer layer, for example an adhesive layer, by means of which the hot stamping film can be fixed on the substrate. It is possible to forego the use of a separate adhesive layer if either a lacquer layer which also has adhesive properties is used or if the adhesive is applied to the substrate before applying the layer having the structure. Having regard to the various options referred to hereinbefore therefore it is to be understood that the term "plastic or lacquer layer" in accordance with the invention is used to denote not just layers of that nature in the strict sense but for example also films, adhesive layers and so forth.

An optical effect which is variable in dependence on the illumination or viewing angle can be produced in the most widely varying ways. Thus it is known for example to achieve motion effects by the use of suitable grating structures, as is described for example in EP 0 105 099 B1. Another possibility involves designing the optically effective structure in such a way that the viewer can recognise differing images in dependence on the illumination or viewing angle, as is the case with all Euro banknotes. The way in which that effect can be achieved in detail can be found for example in EP 0 375 833 B1. It is also known for a suitably variable optical effect to be achieved by means of holographic measures, in which respect recently holographic effects of that kind are generally also achieved by way of suitably configured spatial structures in respect of a separating layer between two plastic or lacquer layers.

A further possible way of achieving an optical appearance which changes in dependence on the illumination or viewing angle is discussed for example in WO 01/03845 A1. More specifically that document describes that in particular changes in colour can be achieved by the use of specific interference layer sequences or however also by using specific printing inks with interference pigments.

Besides the above-discussed strip-shaped security elements there are also a large number of areas of use where security elements in the form of delimited regions are preferred. That applies in particular if the aim is for the security element to be graphically incorporated into the surface configuration of the substrate. In addition design configurations in which the optically variable security element is provided only in given, closely defined regions, give a higher-value impression. In this connection reference may be made to the higher denominations of Euro banknotes (50, 100, 200 and 500 Euros) in each of which there is an optically variable security element in the form of a spatially delimited surface region.

Corresponding security elements are generally manufactured by way of coating plastic films as carrier webs. Those webs are then cut into strips which are then used for suitable transfer of the security elements onto the substrate.

If now the security element is in the form of a strip, that transfer operation does not cause any difficulties. It is generally possible to operate by means of pressure rollers of suitable width, in which respect the film webs having the security elements are cut into strips, prior to application to the substrate, with the width of the strips corresponding to the desired width of the security element strip.

It is also necessary to operate with films in strip form when applying security elements which are intended to cover only specific surface regions on the substrate. In that case however it is necessary to involve additional means which provide that, of a corresponding film web strip, only the respective corresponding surface region is applied to the substrate. When using security elements formed by hot stamping films there is on the one hand the possibility of using pressure tools, for example pressure rollers, which are provided with raised pressure elements which are respectively shaped to correspond to the surface region to be transferred. It will be appreciated that the production of such pressure rollers is considerably more expensive than the production of rollers with a smooth surface.

For that reason it has also already been proposed (see DE 35 11 146 A1) that stamping films without their own adhesive layer can be used and that adhesive can be provided on the substrate in the surface regions for receiving the security element, prior to transfer of the corresponding security element from the hot stamping film onto the substrate. That procedure affords the advantage that it is possible to operate with smooth stamping rollers or stamping wheels during the actual transfer procedure. However, the substrate has to be provided with adhesive in the desired region in a preceding printing operation, and that requires an additional working step and the use of suitable printing forms.

It was also already proposed (see DE 198 13 314 A1) that the layer sequence of a stamping film, which sequence is detachable from the carrier film and has the security element, can be subdivided into corresponding individual mutually separated surface regions, in which case then the adhesive layer is also provided only in those regions. The use of such a hot stamping film for applying the security elements to the substrate in predetermined surface regions also makes it possible to use smooth stamping rollers. The production of such hot stamping films however is comparatively complicated.

In addition, all the known methods of applying security elements to substrates in the form of delimited surface regions suffer from the common difficulty that the individual security element surface regions are usually arranged at a comparatively large spacing from each other on the substrate, for example a sheet with quite a number of banknotes. When transferring the security elements from a strip, that either means a comparatively large amount of waste or it requires the use of special measures which make it possible for one and the same starting strip with security elements to be passed over the substrate a plurality of times but in suitably displaced relationship, and thus, in a second or third pass over the substrate, to make use of the regions respectively remaining between transferred surface regions of suitably structured material or material which is adapted to be optically variable in some other fashion, to produce further security element surface regions. A corresponding apparatus is described in DE 42 42 105 A1.

DE 43 34 847 A1 discloses a value-bearing document with a window, in which the window is covered by means of a strip of a laminating film, which strip extends over the width of the document and is secured to the surface of the document. That laminating film strip includes a carrier film on which there are two lacquer layers, between which is arranged an optically effective structure in two definedly delimited surface regions. In that arrangement the one surface region is provided within the window while the other surface region is arranged over the substrate of the value-bearing document. The laminating film forming the strip is arranged in a recess in the surface of the substrate, which is desirably produced by the action of a suitably high pressure on the laminating film when applying the strip. In the case of the known value-bearing document it is absolutely necessary to use a laminating film because it is only that laminating film that is sufficiently stable on the one hand to reliably cover the window and on the other hand not to be damaged by the high forces involved when applying the strip. However there is no incentive for the man skilled in the art to use a corresponding strip if no window is to be covered over, especially as the provision of a recess generally alters the substrate in a mostly undesirable fashion.

SUMMARY OF THE INVENTION

Having regard to the problems set out hereinbefore therefore the object of the invention is to provide a security element which on the one hand is easy and convenient to manufacture and apply but which on the other hand enjoys the advantages and properties and security elements which are limited to a predetermined surface region.

In accordance with the invention, to attain that object, it is provided that a security element in the form of a strip, of the general kind set forth, is so designed that the optically effective layer and/or structure is arranged only in at least two definedly delimited, mutually spaced, visually variable surface regions while the strip outside the visually variable surface regions is transparent and/or not optically variable in dependence on the illumination or viewing angle and/or is adapted to the appearance of the surface of the substrate which in use receives the strip.

The invention is therefore based on the consideration that on the one hand the advantages of applying a strip by means of a transfer film, in particular a hot stamping film, are to be retained, but on the other hand, in spite of applying a strip-shaped element, the appearance of a security element which is delimited in terms of surface area is achieved. For that purpose now in accordance with the invention—in contrast to the previous procedure in the case of transfer films—it is not proposed that a corresponding application of plastic or lacquer layers be implemented only in the visually variable surface region, but that a strip-shaped application be effected, in which respect however the strip is such that the desired effect of a visual variation for the viewer in dependence on the illumination or viewing angle is present actually only in delimited surface regions. For that purpose the configuration of the security element is so selected that an optically effective structure or layer, possibly also a combination of an optically effective structure and layer, is arranged only in the variable surface regions, while the remaining region of the security element strip is such that it cannot be distinguished or can scarcely be distinguished from the surface of the substrate by the observer, which for example can be achieved in that the strip forming the security element is transparent outside the optically variable surface regions so that the surface of the substrate accordingly appears therethrough. Another possibility is for the strip outside the variable surface regions to be optically adapted to the surface of the substrate. Under some circumstances however it is already sufficient, in order to achieve the desired effect of "visual change only in a defined surface region", if the strip outside the visually variable surface regions is such that its appearance does not change in dependence on the illumination and viewing angle, which can be achieved for example by suitable roughening, matting and so forth.

When using a security element according to the invention the application operation can also be implemented in the manner known from strip-shaped security elements with optically variable structures present over the entire strip length. Nonetheless the procedure provides that the substance having the security element enjoys an appearance which substantially corresponds to the appearance which can be achieved if a security element is applied only in given surface regions, but then with the known particular precautions or problems. In particular also when applying strips it is possible to take care to ensure that the correspondingly variable surface regions are very precisely disposed at the intended location, that is to say for example in register relationship with the printing on the substrate. The use of a strip in the form of a transfer film affords, in comparison with a laminating film strip, in particular the advantage of a small thickness in respect of the lacquer or plastic layers which remain after application on the substrate and the ensuing possibility of operating with a comparatively low pressing pressure so that the substrate is not damaged.

In principle the security element according to the invention also involves all known possible ways of producing the optical effect which is variable in dependence on the illumination or viewing angle.

It is provided here for example that the optically effective layer is formed by an interference layer sequence (comprising a multiplicity of thin layers) which produce a change in colour upon a variation in the illumination or viewing angle, wherein desirably the interference layer sequence comprises at least one partially transparent absorption layer and at least one transparent dielectric spacer layer. Interference layer sequences of that kind are described for example in WO 01/03945 A1.

It will be appreciated that in addition it is also possible for the optically effective structure to be in the form of a structure having an optical diffraction effect, in particular a grating structure. As already mentioned structures of that kind are known from EP 0 105 099 B1 and EP 0 375 833 B1.

Upon being applied to a substrate, optically active security elements are generally viewed in incident light. In that respect it is desirable if the plastic or lacquer layer which in the observation direction is in front of the optically effective layer or structure is transparent while a reflection-enhancing layer is arranged behind the optically effective layer or structure in the observation direction.

The reflection-enhancing layer is generally a reflecting metal layer.

It may however also be desirable for certain areas of use if the reflection-enhancing layer is in per se known manner a transparent plastic or lacquer layer whose refractive index differs markedly, preferably by at least 0.2, from the refractive index of the layer disposed in front thereof in the observation direction. An arrangement of that kind is used for example when security elements according to the invention are to be employed on identification cards or the like, in which any items of information, for example images or pictures, alphanumeric characters and so forth are present under the security element.

The strip-shaped security element according to the invention can be unobtrusively applied if the strip is provided outside the visually variable surface regions with a patterning—preferably corresponding to the patterning of the substrate surface which receives the strip. If that patterning is also arranged between the two plastic or lacquer layers, that provides a particularly high level of resistance to abrasion and good stability for the security element.

The patterning of the strip outside the visually variable surface regions can be achieved in the most widely differing ways, for example by roughening. It is particularly desirable however if the patterning is printed, in which case it is possible to achieve particularly good conformity of the patterning on the strip with the patterning of the substrate when the patterning is applied after application of the strip forming the security element, preferably in such a way that the patterning is applied simultaneously to the strip and to the substrate surface carrying the strip, in which case the patterning is designed to extend continuously on the strip and the surface of the substrate, engaging over at least one edge of the strip. With overprinting of the strip in that way, that does not just provide for satisfactory adaptation of the appearance of the strip surface on the one hand and the surface of the substrate on the other hand. Rather, that affords an additional safeguard against forgery because in that way it is practically impossible to replace an existing strip by a new strip, in which respect it is in any case difficult to replace the thin lacquer or plastic layers of the security element after application to the substrate.

Particularly easily detectable effects in the sense of affording a safeguard can be achieved if the visually variable surface regions are in the form of a simple geometrical element, for example a polygon. The surface regions however may also be of other simple geometrical shapes, for example easily remembered figures and so forth.

In this connection it may be desirable if at least two of the visually variable surface regions are of a differing geometrical shape in order in that way to achieve a specific optical impression.

The appearance can be particularly easily remembered from the point of view of the layperson if at least one visually variable surface region is in the form of an alphanumeric character, wherein the easily memorable nature and the function of the security element can be still further improved if—as is also provided—there are a plurality of visually variable surface regions in the form of alphanumeric characters which jointly represent a concept. For example that concept could represent the denomination or currency of a banknote, a reference to validity (for example the word "VALID") or the name of the issuer of the corresponding value-bearing document or the like.

Application of the security elements to substrates is a particularly simple matter as the security elements are in the form of transfer films, in particular hot stamping films. A transfer film, in particular a hot stamping film, is distinguished in that respect in that the actual security element is formed by a layer sequence on a carrier film, wherein that layer sequence is transferred onto the substrate under the effect of pressure and/or heat and the carrier film is detached again after the layer sequence has been applied to the substrate.

Finally the subject of the invention is a value-bearing document having a strip-shaped security element designed in accordance with the invention, wherein the security element is applied in such a way that the visually variable surface regions and/or the patterning are arranged in register relationship with printing or other configurational elements on the surface of the value-bearing document.

BRIEF DESCRIPTION OF THE DRAWINGS

Embodiments by way of example of the invention are described in greater detail hereinafter with reference to the drawing in which.

DETAILED DESCRIPTION OF THE INVENTION

Figure 1:
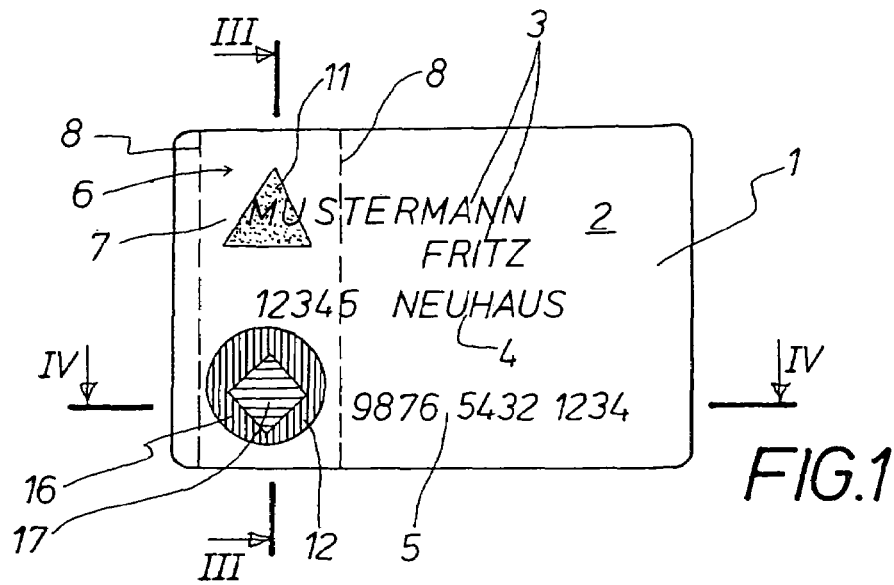
FIG. 1 diagrammatically shows a credit card provided with a security element according to the invention.

The credit card shown in FIG. 1 includes in per se known manner a carrier 1 which is formed for example by a piece of plastic of suitable thickness. That carrier 1 can be provided at its surface overall with a decorative pattern which refers to the respective issuer of the credit card. In addition, on its front side, the credit card carries two pieces of information relating to the owner, for example the name 3 of the owner and the residence 4 of that person. That information can be applied in a manner which is known per se from credit cards or the like, for example printed thereon, or can be embossed into the carrier 1. The same applies to a number 5 which is also present on the front side 2 of the credit card.

In order as far as possible to prevent forgery of the credit card it is provided with a security element 6 in the form of a strip 7 stamped or embossed thereon, the edge 8 of the strip 7 being indicated by broken lines in FIG. 1.

In the illustrated embodiment the security strip 6 is formed by the transfer layer arrangement of a hot stamping film. As can be seen from FIGS. 3 and 4 that transfer layer arrangement includes at least a protective lacquer layer 9 and an adhesive layer 10.

As is known hot stamping films usually comprise a carrier film on which is disposed a transfer layer arrangement composed of one or more plastic or lacquer or adhesive layers. In the processing procedure the hot stamping film is then applied to the substrate with the adhesive layer which faces away from the carrier film and the adhesive is softened by the effect of heat and possibly pressure, whereby the transfer layer arrangement adheres to the substrate. In order to be able to readily pull off the carrier film it is usual to provide between the transfer layer arrangement and the carrier film a release layer, generally a wax-like layer, which also softens under the effect of heat for the purposes of softening the adhesive and thus permits separation of the carrier film and the transfer layer arrangement.

Now, the particularity of the security element 6 shown in FIG. 1 is that it is formed in two definedly delimited and mutually independent surface regions 11 and 12 in such a way that an optical effect which is variable in dependence on the illumination or viewing angle is achieved.

Figure 3:
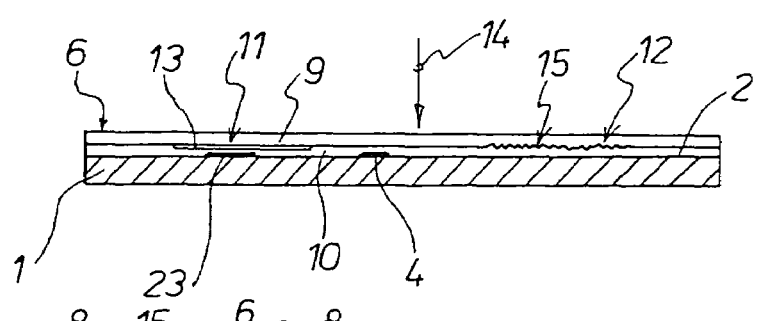

In the illustrated embodiment, provided in the surface region 11 is an interference layer sequence 13 comprising a plurality of thin layers, the individual layers not being shown in FIG. 3 for the sake of clarity. The optical effect which can be achieved when a suitable interference layer sequence is provided is that a colour change occurs upon a variation in the illumination or viewing angle, the colour change being dependent on the thickness of the individual layers and the wavelength of the light used for viewing purposes. In regard to details of suitable interference layer sequences attention can be directed to WO 01/03945 A1.

As can be seen from FIG. 1 in combination with FIG. 3 in the illustrated embodiment, disposed behind the interference layer sequence 13 in the viewing direction 14 is the whole of the letter "M" and a part of the letter "U" of the name 3 of the card holder, as is indicated in FIG. 3 by the printing layer 23. In order to be able to recognise that printing layer 23 as part of the name 3, in the illustrated embodiment the interference layer sequence overall is transparent, in which respect it will be noted that nonetheless to enhance the colour change effect a transparent reflection-enhancing coating can be provided on the side of the interference layer sequence 13, which faces towards the carrier 1 of the card.

The surface region 12 of the card shown in FIG. 1 is provided with a further element which affords differing effects in dependence on the viewing or illumination angle, more specifically with a structure 15 having an optical diffraction effect, preferably a grating structure or a hologram. Now, FIG. 1 diagrammatically indicates that the structure 15, which has an optical diffraction effect, of the surface region 12 has two sub-regions 16 and 17 respectively which differ from each other in that the respective grating parameters (grating frequency, azimuth angle, edge steepness etc.) are different. If for example as shown in FIG. 1 the grating structures are of a differing configuration only insofar as the gratings of the various regions 16 and 17 differ only in respect of the azimuth angle (in the illustrated embodiment by 90°), that already achieves a markedly perceptible optical effect, more specifically insofar as, when viewing from the wide side of the card, for example only the square (region 17) is visible while, when viewing from the narrow side, that is to say upon the card being rotated through 90°, only the region 16 surrounding the square still appears. It will be appreciated that the structure having an optical diffraction effect of the surface region 12 can also be such that substantially more complicated effects are produced, as are described for example in EP 0 105 099 B1 or EP 0 375 833 B1.

FIG. 3 now shows that the interference layer sequence 13 in the surface region 11 and the structure 15 having an optical diffraction effect in the surface region 12 are respectively arranged between two layers, more specifically in the illustrated embodiment being the protective lacquer layer 9 and the adhesive layer 10, which is desirable in particular in consideration of reliable protection for the surface regions 11, 12 against alterations.

The essential characteristic of the security element 6 according to the invention is now that in actual fact only the surface regions 11 and 12 respectively exhibit an optical variation effect which is dependent on the illumination or viewing angle while the remainder of the strip 7 is such that it does not appear in relation to the surface 2 of the card or another substrate.

Figure 4:
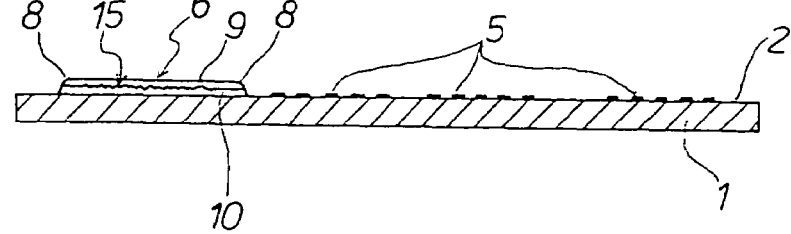

In the embodiment shown in FIGS. 1, 3 and 4 that is achieved in a simple fashion in that the two layers 9, 10 are each crystal-clear transparent so that the strip 7 outside the surface regions 11, 12, after application to the surface 2 of the carrier 1, no longer appears optically at all because only the configuration of the front side 2 of the card is visible to the viewer, in which respect here the fact that the strip 7 on the surface 2 only consists of the two layers 9, 10 further reduces visibility.

It will be appreciated that there are also other possible ways of "concealing" the surface of the strip 7, which is outside the surface regions. For that purpose it is frequently already sufficient if the strip outside the visually variable surface regions 11, 12 is such that it does not optically change in dependence on the illumination or viewing angle, which can be achieved for example by a suitably matt configuration of the strip. A particularly desirable possible way of providing the concealment effect however is that the strip 7 outside the variable surface regions 11, 12 is adapted to the appearance of the surface 2 of the substrate, for example the card.

Figure 2:
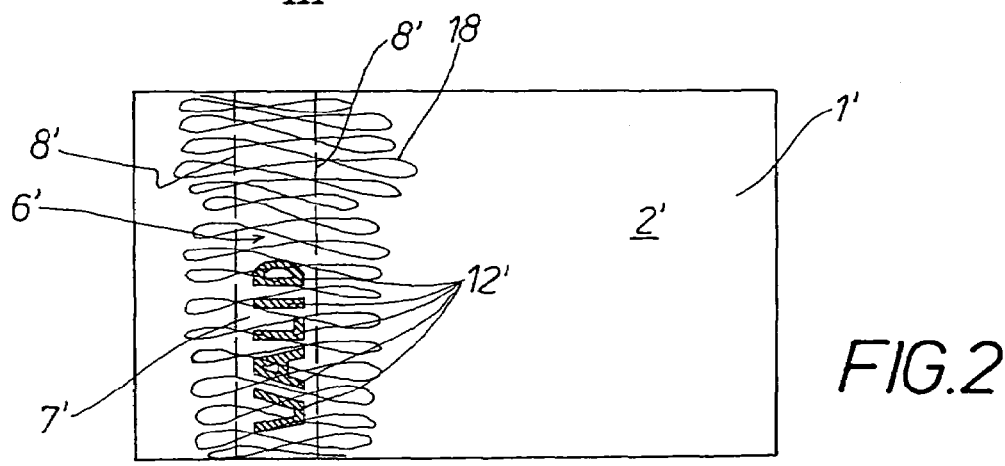
FIG. 2 shows a value-bearing document, for example a cheque, share certificate or the like, provided with a security element according to the invention, and FIGS. 3 and 4 each show sections taken along lines III-III and IV-IV respectively in FIG. 1, wherein neither the dimensions nor the thicknesses of the individual layers are shown true to scale and the respective layer sequence is shown in greatly simplified form.

Such an embodiment is illustrated in FIG. 2.

In that case a security element 6' is also formed by a strip 7', the edges 8' of which are also indicated by broken lines.

In the embodiment of FIG. 2 the strip 7' carries five surface regions 12' which are formed for example by a grating structure having an optical diffraction effect. The five surface regions 12' are spatially relatively closely adjacent similarly to a seal or the like and involve the outline contours of the letters "V", "A", "L", "I" and "D" respectively so that the word "VALID" is formed when the structure with the optical diffraction effect in the surface regions 12' is visible to the viewer.

Now, in the embodiment shown in FIG. 2, the strip 7' is adapted to the surface 2' of the carrier 1', for example a cheque form or the like, by virtue of the fact that the strip 7' carries a patterning 18 corresponding to the patterning of the surface 2' of the substrate 1', the patterning in the embodiment being illustrated in the form of guilloche-like loops.

As it is basically possible for the strips 6' forming the security elements 7' to be applied to the surface 2' of the carrier 1' in accurate register relationship it is possible for the strip to be already also appropriately patterned outside the surface regions 12' upon manufacture of the strip, which can be effected for example in a printing operation, in which case then the printing layer for security reasons is desirably also arranged between the two plastic or lacquer layers (9 or 10 in FIG. 3).

Particularly good adaptation of the strip 7' in the region outside the variable surface regions 12' can however be achieved if the value-bearing document or the like in the form of the carrier 1' is only subsequently printed upon after application of the strip 7' forming the security element 6', in which case the print image is then to be so positioned that it admittedly covers both the strip and also the surface 2' of the carrier 1', but not the optically variable surface regions 12'. The print image should desirably engage over at least one of the edges 8'.

It will be seen from the foregoing description that, when using security elements according to the invention, it is possible to achieve effects, as hitherto could only be achieved when corresponding, optically variable elements were applied only in spatially delimited manner to a substrate. Nonetheless it is possible to make use of all the advantages of the strip application of transfer films, in particular ease of application of the security elements with correspondingly high working speeds in conjunction with particularly good adhesion on the substrate.

The invention claimed is:

1. A value-bearing document comprising:
   a substrate; and
   a security element in the form of a security strip applied to a surface area of the substrate wherein the security strip safeguards authenticity or quality of the substrate, wherein the security strip is formed by a transfer layer arrangement of a transfer film, and wherein the security strip is disposed on the substrate spaced away from a first edge and an opposed second edge of the substrate and extending from a third edge to an opposed fourth edge of the substrate, wherein the security comprises at least two plastic or lacquer layers between which is arranged at least one optically effective layer and/or structure producing an optical effect which is variable in dependence on an illumination or viewing angle, wherein the optically effective layer and/or structure is arranged in at least two definably delimited, mutually spaced, regions of the security strip forming at least two visually variable security strip regions and wherein all further regions of the security strip outside the at least two visually variable security strip regions do not produce an optical effect which is variable in dependence of the illumination and viewing angle, the security strip in all further regions of the security strip outside the visually variable security strip regions is transparent and/or is adapted to an appearance of the surface of the substrate, and the presence of the security strip in all further regions of the security strip outside the visually variable security strip regions cannot be distinguished from the surface of the substrate by an observer.

2. A value-bearing document according to claim 1, wherein an optically effective layer is formed by an interference layer sequence which produces a colour change upon a variation in the illumination or viewing angle.

3. A value-bearing document according to claim 2, wherein the interference layer sequence comprises at least one partly transparent absorption layer and at least one transparent dielectric spacer layer.

4. A value-bearing document according to claim 1, wherein the structure is a structure having an optical diffraction effect, the structure comprising a grating structure.

5. A value-bearing document according to claim 1, wherein one of the at least two plastic or lacquer layers which in an observation direction is in front of an optically effective layer or structure is transparent, wherein a reflection-enhancing layer is arranged in the observation direction behind the optically effective layer or structure.

6. A value-bearing document according to claim 5, wherein the reflection-enhancing layer comprises a reflecting metal layer.

7. A value-bearing document according to claim 5, wherein the reflection-enhancing layer comprises a transparent plastic or lacquer layer whose refractive index differs by at least 0.2, from a refractive index of a layer in front thereof in the observation direction.

8. A value-bearing document according to claim 1, wherein the strip comprises a patterning outside the at least two visually variable surface regions.

9. A value-bearing document according to claim 8, wherein the patterning of the strip corresponds to a patterning of the surface of the substrate receiving the strip.

10. A value-bearing document according to claim 8, wherein the patterning is also arranged between the at least two plastic or lacquer layers.

11. A value-bearing document according to claim 8, wherein the patterning is printed.

12. A value-bearing document according to claim 8, wherein the patterning is applied after application of the security strip to the substrate.

13. A value-bearing document according to claim 8, wherein the patterning is applied simultaneously to the security strip and the side of the substrate which carries the security strip, wherein the patterning is designed to extend continuously on the security strip and the substrate, engaging over at least one edge of the security strip.

14. A value-bearing document according to claim 8, wherein the security strip is applied in such a way that the visually variable security strip regions and/or the patterning are arranged in register relationship with printing or other configurational elements on the surface of the substrate of the value-bearing document.

15. A value-bearing document according to claim 1, wherein at least one visually variable security strip region includes the shape of a simple geometrical element.

16. A value-bearing document according to claim 1, wherein the at least two of the visually variable security strip regions are of different geometrical shapes.

17. A value-bearing document according to claim 16, comprising a plurality of visually variable security strip regions in the form of alphanumeric characters which jointly represent a concept.

18. A value-bearing document according to claim 1, wherein at least one visually variable security strip region is in the form of an alphanumeric character.

19. A value-bearing document according to claim 1, wherein the security strip is applied in such a way that the at least two visually variable security strip regions and/or the patterning are arranged in register relationship with printing or other configurational elements on the surface of the substrate of the value-bearing document.

20. A value-bearing document according to claim 1, wherein the value-bearing document is one of a banknote, a cheque, a share certificate, a credit card, an identity card and a pass.

21. A value-bearing document according to claim 1, wherein the transfer film is a hot stamping film.

* * * * *